(12) United States Patent
Tada

(10) Patent No.: US 9,935,731 B2
(45) Date of Patent: Apr. 3, 2018

(54) COMMUNICATION APPARATUS, LENS APPARATUS AND IMAGE PICKUP APPARATUS INCLUDING THE SAME

(71) Applicant: CANON KABUSHIKI KAISHA, Tokyo (JP)

(72) Inventor: Takashi Tada, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/212,497

(22) Filed: Jul. 18, 2016

(65) Prior Publication Data

US 2017/0033886 A1 Feb. 2, 2017

(30) Foreign Application Priority Data

Jul. 31, 2015 (JP) .................................. 2015-151986

(51) Int. Cl.
| | |
|---|---|
| *H04L 27/28* | (2006.01) |
| *H04L 1/00* | (2006.01) |
| *H04L 12/24* | (2006.01) |
| *H04L 29/06* | (2006.01) |

(52) U.S. Cl.
CPC .......... *H04L 1/0002* (2013.01); *H04L 1/0036* (2013.01); *H04L 41/00* (2013.01); *H04L 69/24* (2013.01); *H04L 69/28* (2013.01)

(58) Field of Classification Search
CPC ....... H04L 1/0002; H04L 1/036; H04L 69/28; H04N 5/23209
See application file for complete search history.

(56) References Cited

U.S. PATENT DOCUMENTS

| | | | | |
|---|---|---|---|---|
| 7,684,477 | B1 * | 3/2010 | Vijayaraghavan | .... H04L 1/0002 375/225 |
| 8,054,899 | B2 * | 11/2011 | Kogawa | .............. H04L 27/2607 370/230 |
| 2007/0124627 | A1 * | 5/2007 | Katano | ................. H04L 1/0002 714/708 |
| 2009/0067523 | A1 * | 3/2009 | Tzannes | ................ H04L 1/0002 375/260 |
| 2015/0003344 | A1 * | 1/2015 | Suwa | .................... H04L 5/0062 370/329 |

FOREIGN PATENT DOCUMENTS

| | | |
|---|---|---|
| JP | H05236048 A | 9/1993 |
| JP | 2004064616 A | 2/2004 |

* cited by examiner

*Primary Examiner* — Dac Ha
(74) *Attorney, Agent, or Firm* — Rossi, Kimms & McDowell LLP

(57) ABSTRACT

A communication apparatus has a communicator configured to communicate with an external device capable of communication at multiple communication rates, a communication rate setter configured to change a communication rate of the communicator, and a period detector configured to detect a change period of the communication rates of the external device. The communication rate setter changes the communication rate based on the change period detected by the period detector.

9 Claims, 14 Drawing Sheets

START-STOP SYNCHRONOUS COMMUNICATION BYTE FORMAT 11 BITS

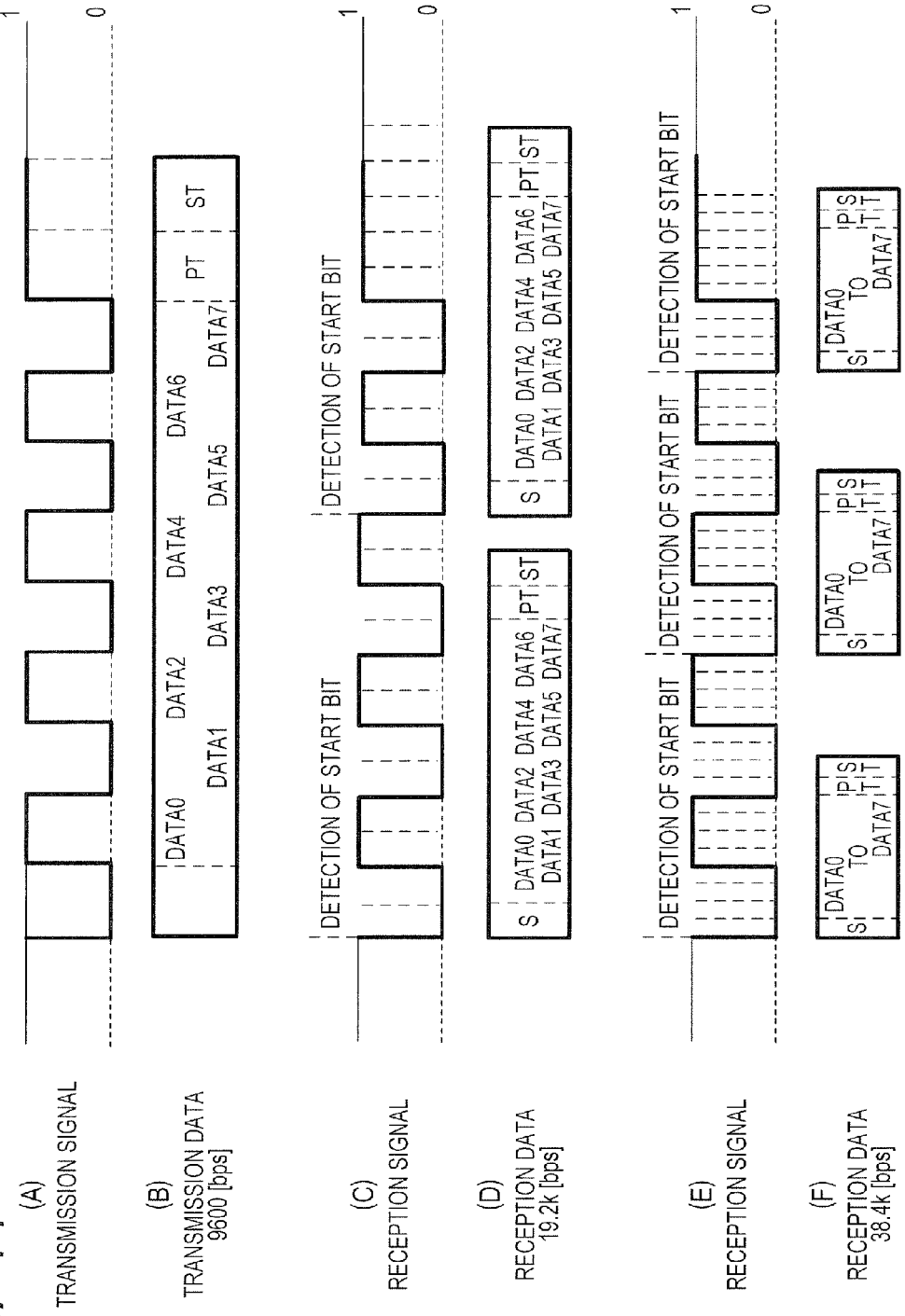

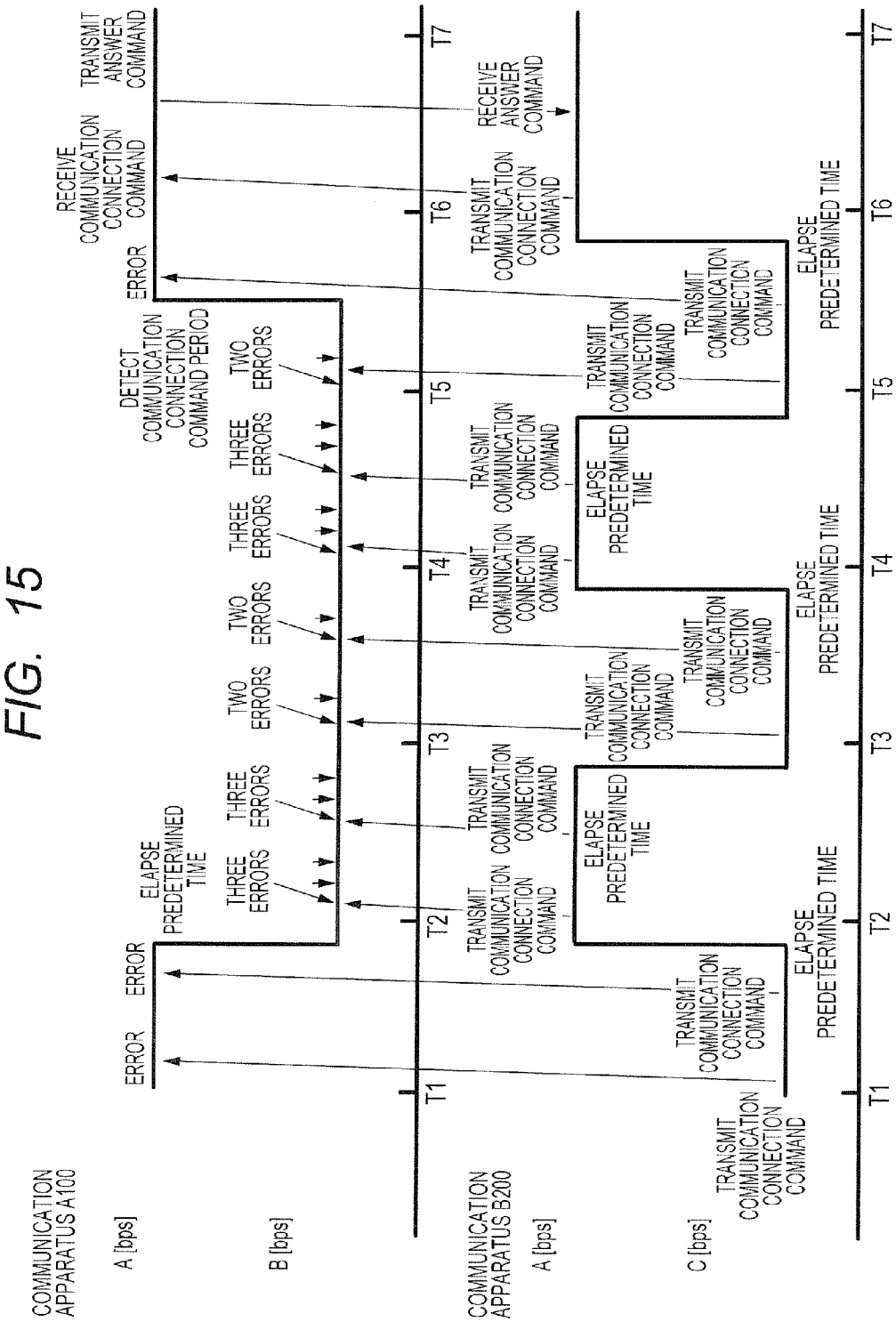

COMMUNICATION APPARATUS, LENS APPARATUS AND IMAGE PICKUP APPARATUS INCLUDING THE SAME

BACKGROUND OF THE INVENTION

Field of the Invention

The present invention relates to a communication apparatus, and particularly relates to a communication apparatus, for example, configured to perform communication with another apparatus at the matched baud rate, these two apparatuses each including a microprocessor or the like capable of changing the baud rate to a desired rate; and a lens apparatus and an image pickup apparatus including the communication apparatus.

Description of the Related Art

Heretofore, there has been a method for allowing two apparatuses to set a baud rate using baud rate setting data when performing data communication. In this method, one of the two apparatuses does not change the baud rate, while the other apparatus sequentially changes the baud rate, thereby setting the baud rate allowing normal transmission and reception.

For example, Japanese Patent Application Laid-Open No. 2004-64616 (hereinafter, JP-A 2004-64616) discloses a method for allowing two apparatuses to match their baud rates by using baud rate setting data when performing data communication, in which the transmission side apparatus transmits the setting data at a baud rate unknown to the reception side apparatus, while the reception side apparatus sequentially changes and matches the baud rate with the baud rate of the transmission side apparatus.

Japanese Patent Application Laid-Open No. H05-236048 (hereinafter, JP-A 5-236048) discloses a configuration for matching baud rates using baud rate checking data, in which a transmission side apparatus transmits the checking data while sequentially changing a baud rate, until a reception side apparatus replies that the baud rate is matched, thereby matching the baud rates.

In the conventional techniques disclosed in JP-A 2004-64616 and JP-A 5-236048, if both of the two apparatuses to perform data communication change their baud rates, the baud rate allowing normal transmission and reception cannot be set. For example, in both the methods described in JP-A 2004-64616 and JP-A 5-236048, one of the apparatuses changes the baud rate in order to match the baud rate with the fixed baud rate of the other apparatus. Nonetheless, suppose a case where the other apparatus also changes the baud rate by the same process. In this case, when the one apparatus changes the baud rate, the other apparatus also simultaneously changes the baud rate to a different baud rate. Consequently, these changes in baud rate never come to an agreement, making it impossible to set a baud rate allowing normal transmission and reception in some cases.

SUMMARY OF THE INVENTION

An object of the present invention is to provide a communication apparatus capable of, even in communication with a counterpart apparatus inputting communication connection commands while changing a communication rate (baud rate), detecting a communication connection command period based on the input, changing its own baud rate in conformity with the period of the counterpart apparatus, and thereby setting a baud rate allowing normal transmission and reception.

A communication apparatus of the present invention is characterized as follows. Specifically, the communication apparatus has a communicator that communicates with an external device capable of communication at multiple communication rates, a communication rate setter that changes a communication rate of the communicator, and a period detector that detects a change period of the communication rates of the external device. The communication rate setter changes the communication rate based on the change period detected by the period detector.

According to the present invention, it is possible to provide a communication apparatus capable of, even in communication with a counterpart apparatus inputting communication connection commands while changing a baud rate, detecting a communication connection command period based on the input, changing its own baud rate in conformity with the period of the counterpart apparatus, and thereby setting a baud rate allowing normal transmission and reception.

Further features of the present invention will become apparent from the following description of exemplary embodiments with reference to the attached drawings.

BRIEF DESCRIPTION OF THE DRAWINGS

FIG. 14 shows a difference in reception data when transmitted and received baud rates are different.

FIG. 15 shows baud rate transitions until the apparatuses determine baud rates in Embodiment 3.

DESCRIPTION OF THE EMBODIMENTS

Preferred embodiments of the present invention will now be described in detail in accordance with the accompanying drawings.

Embodiment 1

Hereinafter, a communication apparatus according to a first embodiment of the present invention will be described with reference to FIGS. 1 to 6. In the present embodiment, as one example of the communication apparatus, the description will be given of a communication apparatus configured to perform start-stop synchronous serial communication and to determine a baud rate communicable between communication apparatuses, among predetermined multiple baud rates (communication rates).

Figure 1:
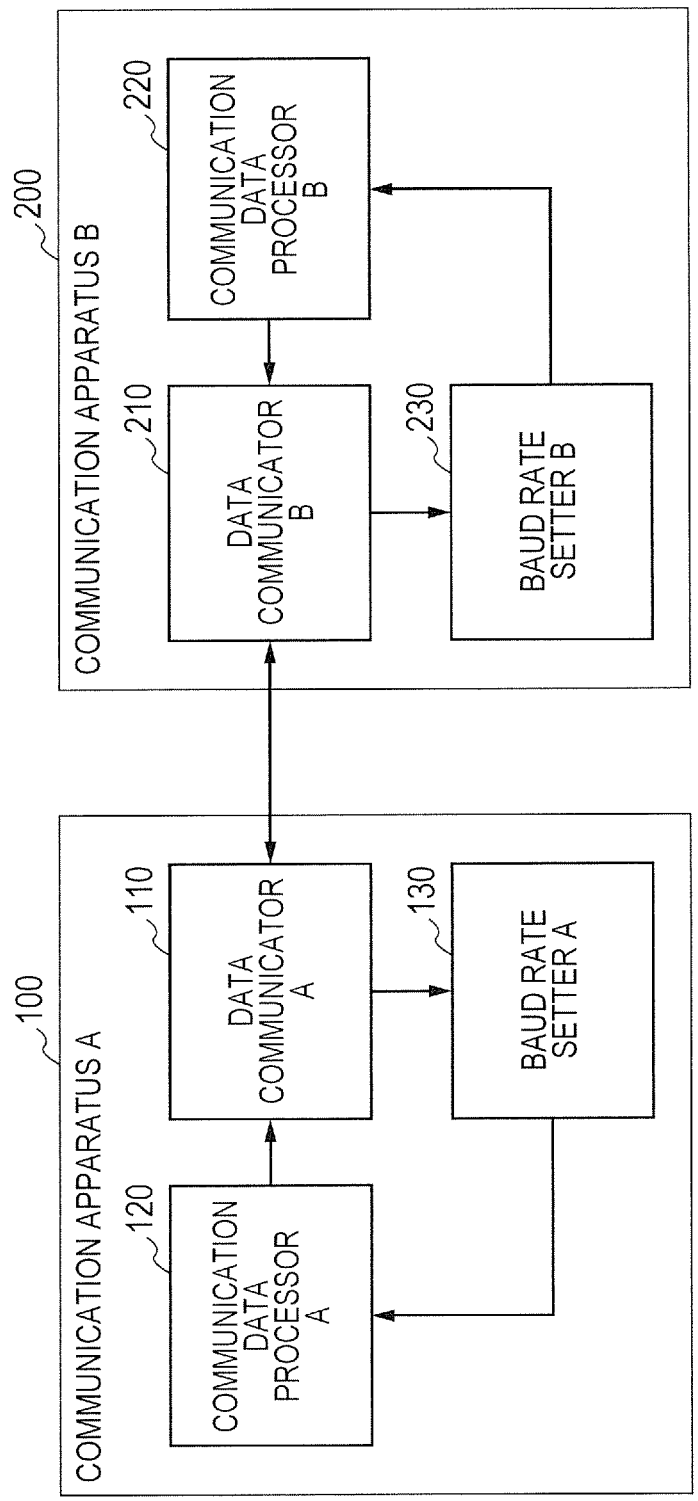
FIG. 1 shows configurations of a communication apparatus A100 and a communication apparatus B200 in Embodiment 1.

FIG. 1 shows configurations of communication apparatuses according to the first embodiment of the present invention.

A communication apparatus A100 includes a data communicator A110, a communication data processor A120 (reception error detector), and a baud rate setter A130 (communication rate setter, period detector).

The data communicator A110 is connected to an external device, and is capable of transmitting and receiving communication data. Moreover, the data communicator A110 is connected to the baud rate setter A130, and is configured to check a baud rate set by the baud rate setter and to communicate with the external device at the baud rate.

The communication data processor A120 is connected to the data communicator A110, and is configured to check data received by the data communicator A110, to process a communication connection command, and to detect a reception error. Moreover, the communication data processor A120 is configured to create and set an answer command as transmission data in the data communicator A110.

The baud rate setter A130 is connected to the communication data processor A120, and is configured to check a communication connection command and a reception error processed and detected by the communication data processor A120, and to set a baud rate used in a communication. Further, the baud rate setter A130 is configured to detect a communication connection command period (baud rate change period) based on multiple reception errors to set a baud rate used in a communication. In the present specification, the term communication connection command period refers to a time of changing a set of baud rates by a data communicator of a transmission side apparatus in order to establish a communication connection. To put it differently, in a case where the data communicator is capable of transmission at multiple baud rates, the communication connection command period refers to a time of completing a series of transmissions of communication connection commands at the multiple baud rates.

A communication apparatus B200 includes a data communicator B210, a communication data processor B220, and a baud rate setter B230.

The communication apparatus B200, the data communicator B210, the communication data processor B220, and the baud rate setter B230 have the same basic configurations as those of the communication apparatus A100, the data communicator A110, the communication data processor A120, and the baud rate setter A130, respectively.

Nevertheless, the baud rate setter B230 does not detect a communication connection command period unlike the baud rate setter A130.

The communication data processor B220 is configured to generate communication connection commands, which are transmission data, at constant intervals until a communicable baud rate is determined, and to set the communication connection commands in the data communicator B210.

The data communicator A110 and the data communicator B210 are connected to each other, and are configured to communicate with each other.

The communication apparatus A100 is capable of communication at two baud rates of A [bps] and B [bps]. A baud rate initial value of the baud rate setter A130 is A [bps], and the baud rate is changed based on a reception error. Moreover, when multiple reception errors are detected and then a communication connection command period is detected, the baud rate is changed according to the communication connection command period. Further, a communicable baud rate is determined by completing the processing of the received communication connection command. When the communicable baud rate is determined, the communication data processor A120 generates and sets an answer command as transmission data in the data communicator A110. After the baud rate is determined, a communication is performed at the baud rate.

The communication apparatus B200 is capable of communication at two baud rates of A [bps] and C [bps]. A baud rate initial value of the baud rate setter B230 is C [bps], and the baud rate is changed when a predetermined time elapses. Moreover, a communicable baud rate is determined by completing the processing of the received answer command. After the baud rate is determined, a communication is performed at the baud rate.

With such a configuration, transmission data generated by the communication data processor B220 can be inputted to the communication data processor A120 via the data communicator B210 and the data communicator A110. Moreover, the communication data processor A120 generates response data based on the received data, and the response data can be inputted to the communication data processor B220 via the data communicator A110 and the data communicator B210. This makes it possible to exchange information between the communication apparatus A100 and the communication apparatus B200. Further, even when both the baud rate setter A130 and the baud rate setter B230 are used to convert communication baud rates, the communication apparatus A100 is capable of setting the same baud rate as that of the communication apparatus B200.

Next, using FIGS. 2 and 3, description will be given of processing in which even when both of the baud rate setter A130 and the baud rate setter B230 change communication baud rates, the communication apparatus A100 changes a communication baud rate to, and in conformity with, the same baud rate as that of the communication apparatus B200.

Figure 2:
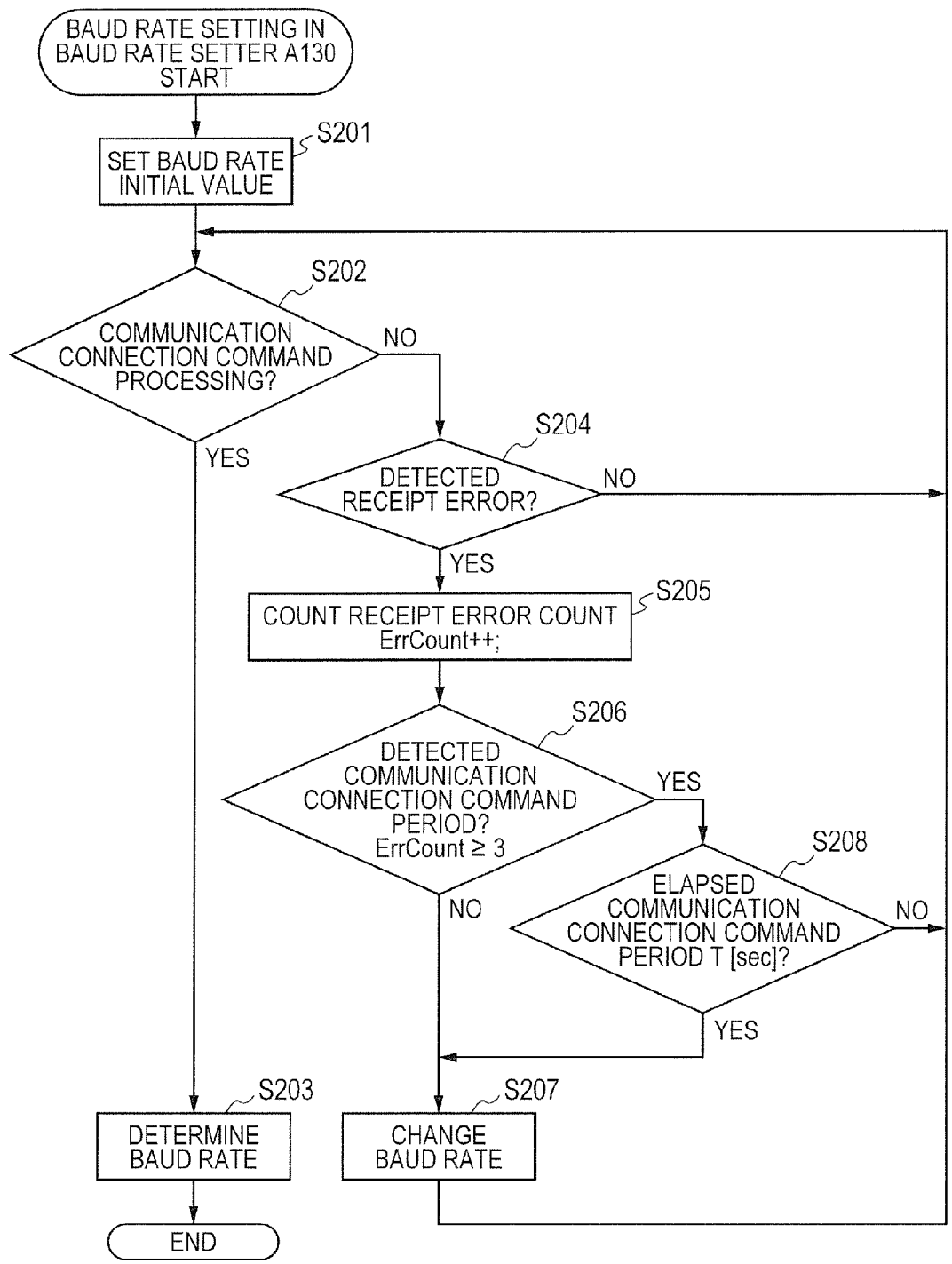
FIG. 2 shows a processing flowchart of a baud rate setter A130 in Embodiment 1.

FIG. 2 is a flowchart showing the processing until the baud rate setter A130 determines a baud rate.

In S201, the baud rate is set to the initial value. Then, the processing proceeds to S202.

In S202, whether the communication data processor A120 has processed any communication connection command or not is checked. If a communication connection command has been processed, the processing proceeds to S203. If no communication connection command has been processed, the processing proceeds to S204.

In S203, the baud rate is determined. Then, the processing ends.

In S204, whether the communication data processor A120 has detected any reception error or not is checked. If a reception error(s) have been detected, the processing proceeds to S205. If no reception error has been detected, the processing returns to S202.

In S205, the number of reception errors detected by the communication data processor A120 is counted. Then, the processing proceeds to S206.

In S206, if the number of reception errors counted by the communication data processor A120 so far is 3 or more, and simultaneously if a communication connection command period T [sec] is detectable, the processing proceeds to S208.

If the communication connection command period T [sec] is undetectable, the processing proceeds to S207.

In S207, the baud rate is changed. Specifically, if the baud rate has been A [bps], it is set to B [bps], or if B [bps], the baud rate is set to A [bps]. Then, the processing proceeds to S202.

In S208, whether the communication connection command period T [sec] has elapsed or not is judged. If the communication connection command period T [sec] has elapsed, the processing proceeds to S207. If the communication connection command period T [sec] has not elapsed, the processing returns to S202.

Figure 3:
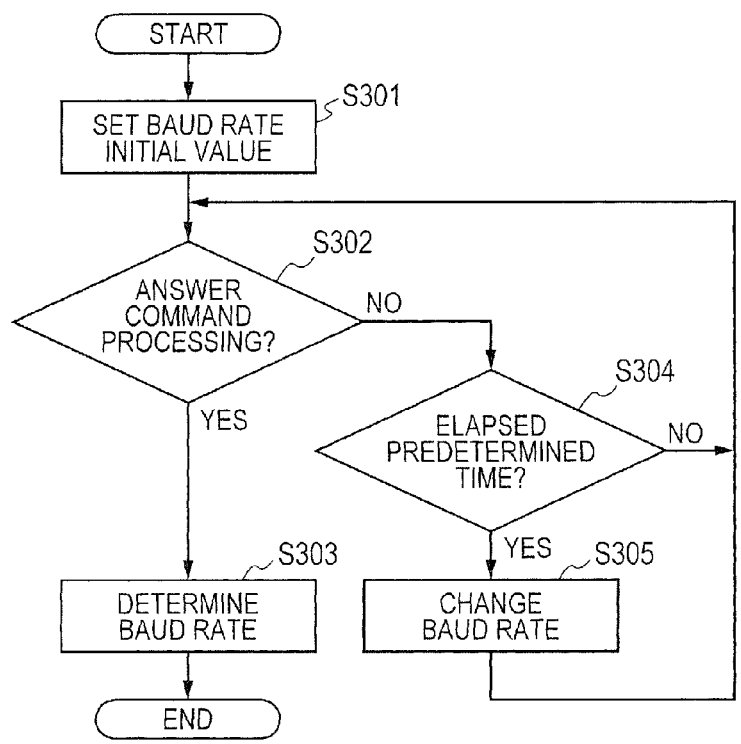
FIG. 3 shows a processing flowchart of a baud rate setter B230 in Embodiment 1.

FIG. 3 is a flowchart showing the processing until the baud rate setter B230 determines a baud rate.

In S301, the baud rate is set to the initial value. Then, the processing proceeds to S302.

In S302, whether the communication data processor B220 has processed any answer command or not is checked. If an answer command has been processed, the processing proceeds to S303. If no answer command has been processed, the processing proceeds to S304.

In S303, the baud rate is determined. Then, the processing ends.

In S304, whether a predetermined time has elapsed or not is judged. If the predetermined time has elapsed, the processing proceeds to S305. If the predetermined time has not elapsed, the processing returns to S302.

In S305, the baud rate is changed. Specifically, if the baud rate has been C [bps], it is set to A [bps], or if A [bps], the baud rate is set to C [bps]. Then, the processing returns to S302.

According to the processing flow described above, the communication apparatus A100 is capable of changing a communication baud rate to, and in conformity with, the same baud rate as that of the communication apparatus B200.

Next, using FIGS. 4 and 5, description will be given of a method for detecting communication connection commands in the error detection, and detecting a communication connection command period from intervals of the communication connection commands.

Figure 4:
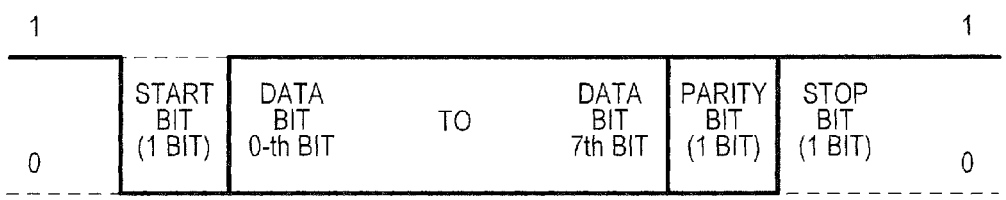
FIG. 4 shows one example of a byte format of a signal used in start-stop synchronous serial communication.

FIG. 4 shows one example of a byte format of a signal used in start-stop synchronous communication. After the data communicator A110 receives a start bit of a signal, if a predetermined value of any one of a data bit (8 bits), a parity bit (1 bit), and a stop bit (1 bit) is not detected at a detection position where the one of these bits is supposed to be detected, a reception error is generated.

Meanwhile, communication apparatuses configured to determine a baud rate using communication connection commands continue transmitting and receiving only communication connection commands until a baud rate is determined. Thus, in an environment where only communication connection commands are transmitted and received, the generation of a reception error conceivably indicates that a communication connection command has been received.

Figure 5:
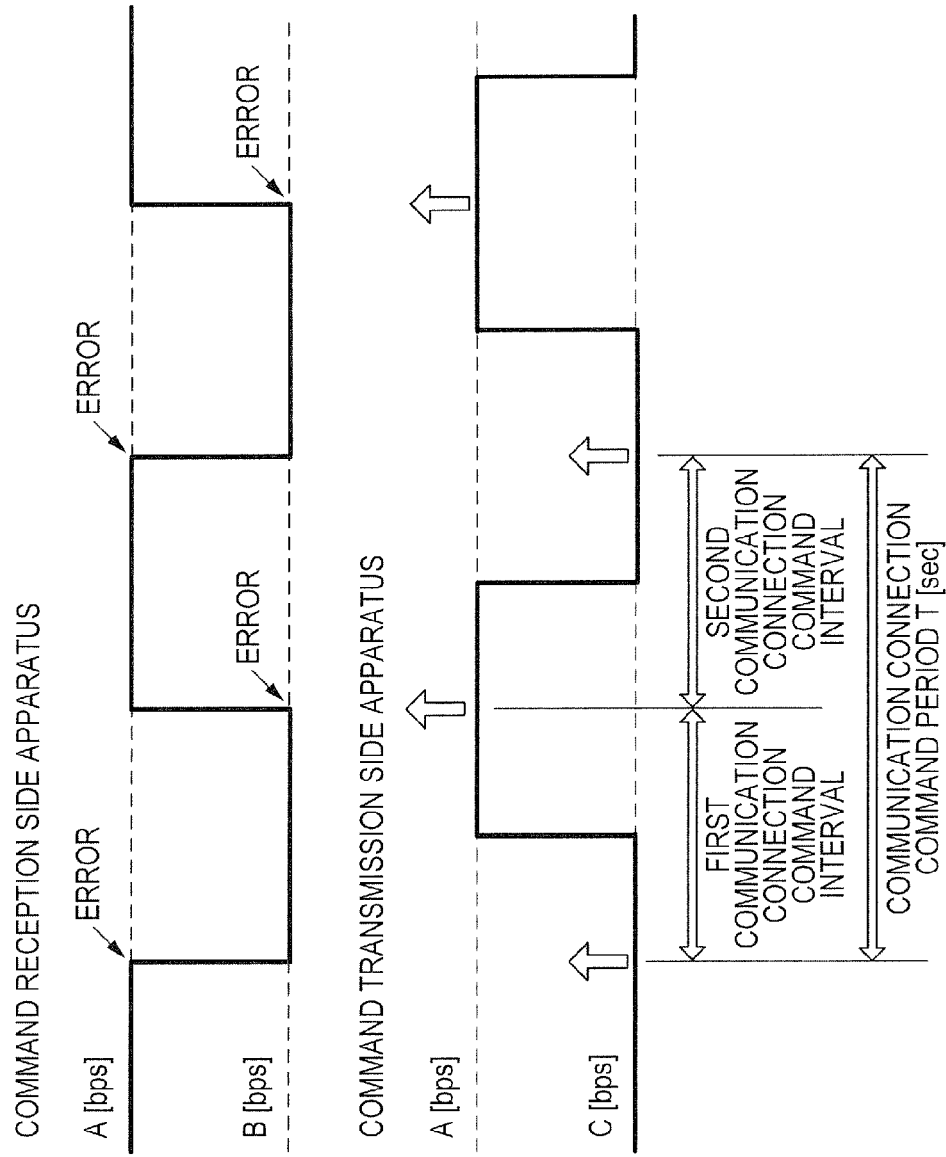
FIG. 5 shows baud rate transitions when the apparatuses have different baud rates in Embodiment 1.

FIG. 5 shows the apparatuses transmitting and receiving communication connection commands therebetween at different baud rates in which communication connection commands of the transmission side apparatus indicate errors generated in the reception side apparatus. Since the generation of a communication connection command can be found by detecting a reception error, when three reception errors are detected as illustrated and corresponding three reception times of the communication connection commands are found, combining these gives the first and the second communication connection command intervals. Here, a communication connection command period T [sec] is obtained from two communication connection command intervals.

As described using FIGS. 4 and 5 above, a communication connection command period can be detected from reception intervals of communication connection commands detected in the error detection.

Finally, using FIGS. 2, 3, and 6, description will be given that the communication apparatuses according to the first embodiment of the present invention are capable of changing the respective communication baud rates, determining a baud rate allowing transmission and reception, and performing communication therebetween.

Figure 6:
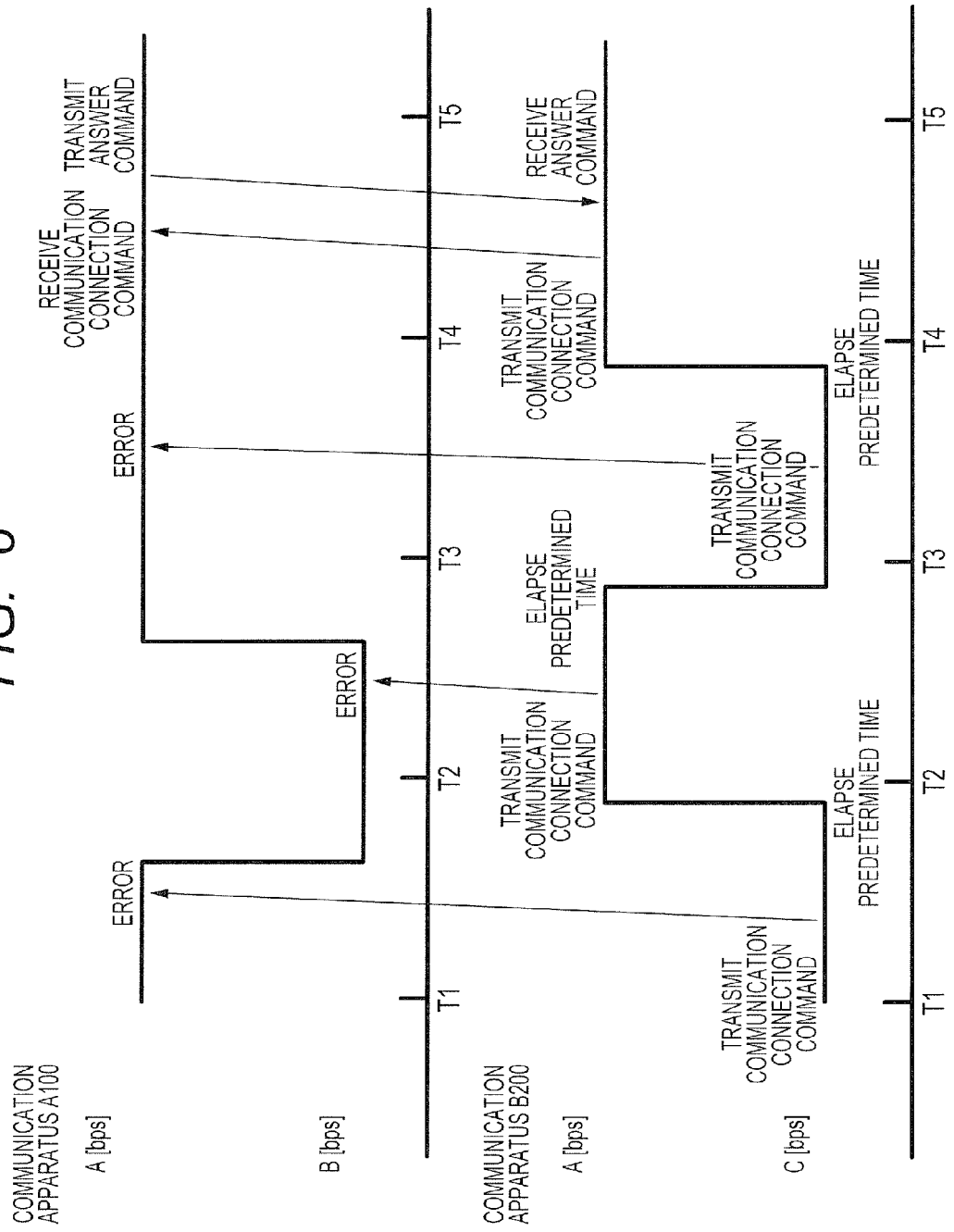
FIG. 6 shows baud rate transitions until the apparatuses determine baud rates in Embodiment 1.

FIG. 6 is a timing chart showing baud rate transitions until the communication apparatus A100 and the communication apparatus B200 finally match baud rates with each other according to the processings of the baud rate setter A130 shown in FIG. 2 and the baud rate setter B230 shown in FIG. 3.

In FIG. 6, the communication apparatus A100 and the communication apparatus B200 are disposed. The rectangular solid lines indicate baud rates changed according to the processings of the baud rate setter A130 and the baud rate setter B230, and comments near the rectangular solid lines indicate generation events in each communication apparatus. The arrows each mean that a communication connection command or an answer command is transmitted or received between the communication apparatuses. The straight lines to which symbols T1 to T5 are assigned below each communication apparatus represent time zones partitioned by time for the convenience of the description.

In the zone [T1-T2], a communication is started, and the baud rate setter A130 sets the baud rate initial value of the communication apparatus to A [bps] (S201). The baud rate setter B230 sets the baud rate initial value of the communication apparatus to C [bps] (S301). The data communicator B210 transmits a communication connection command at C [bps]. The data communicator A110 receives the communication connection command at A [bps]. Since the transmission side and the reception side have different baud rates, a reception error occurs. The baud rate setter A130 checks that no communication connection command has been processed (S202), and that the communication data processor A120 has detected the reception error (S204). Then, the baud rate setter A130 increments the count value (S205). Subsequently, since no communication connection command period T [sec] has been detected (S206), the baud rate is changed to B [bps] (S207). The baud rate setter B230 checks that the predetermined time has elapsed (S304) with no answer command being processed (S302). Then, the baud rate is changed to A [bps] (S305).

In the zone [T2-T3], the data communicator B210 transmits a communication connection command again at A [bps]. The data communicator A110 receives the communication connection command at B [bps]. Since the transmission side and the reception side have different baud rates, a reception error occurs. The baud rate setter A130 checks that no communication connection command has been processed (S202), and that the communication data processor A120 has detected the reception error (S204). Then, the baud rate setter A130 increments the count value (S205). Subsequently, since no communication connection command period T [sec] has been detected (S206), the baud rate is changed to A [bps] (S207). The baud rate setter B230 checks that the predetermined time has elapsed (S304) with no answer command being processed (S302). Then, the baud rate is changed to C [bps] (S305).

In the zone [T3-T4], the data communicator B210 transmits a communication connection command again at C [bps]. The data communicator A110 receives the communication connection command at A [bps]. Since the transmission side and the reception side have different baud rates, a reception error occurs. The baud rate setter A130 checks that no communication connection command has been processed (S202), and that the communication data processor A120 has detected the reception error (S204). Then, the baud rate setter A130 increments the count value (S205). Subsequently, since the number of reception errors detected is now 3 or more, the communication connection command period T [sec] has been detected (S206). In addition, the communication connection command period T [sec] has not elapsed (S208). Hence, the baud rate is not changed. The baud rate setter B230 checks that the predetermined time has elapsed (S304) with no answer command being processed (S302). Then, the baud rate is changed to A [bps] (S305).

In the zone [T4-T5], the data communicator B210 transmits a communication connection command again at A [bps]. The data communicator A110 receives the communication connection command at A [bps]. Since the baud rates during the transmission and during the reception match with each other, the communication connection command is processed. The baud rate setter A130 checks that the communication data processor A120 has processed the communication connection command (S202). Then, the baud rate is determined (S203). Since the communication connection command has been processed, the data communicator A110 transmits an answer command at A [bps] to the data communicator B210. The data communicator B210 receives the answer command at A [bps]. Since the transmission side and the reception side have the same baud rate, the answer command is processed. The baud rate setter B230 checks that the communication data processor B220 has processed the answer command (S302). Then, the baud rate is determined (S303).

As described above, the communication apparatus A100 is capable of: detecting a communication connection command period in the communication with the communication apparatus B200 configured to input communication connection commands while changing a baud rate; changing a baud rate on the basis of the period to determine a baud rate allowing transmission and reception; and thereby performing the communication.

Embodiment 2

Next, a communication apparatus according to a second embodiment of the present invention will be described below with reference to FIGS. 1, 3, and 7 to 10. In the present embodiment, as one example of the communication apparatus, the description will be given of a communication apparatus configured to perform start-stop synchronous serial communication and to determine a baud rate communicable between communication apparatuses, among predetermined multiple baud rates.

Figure 7:
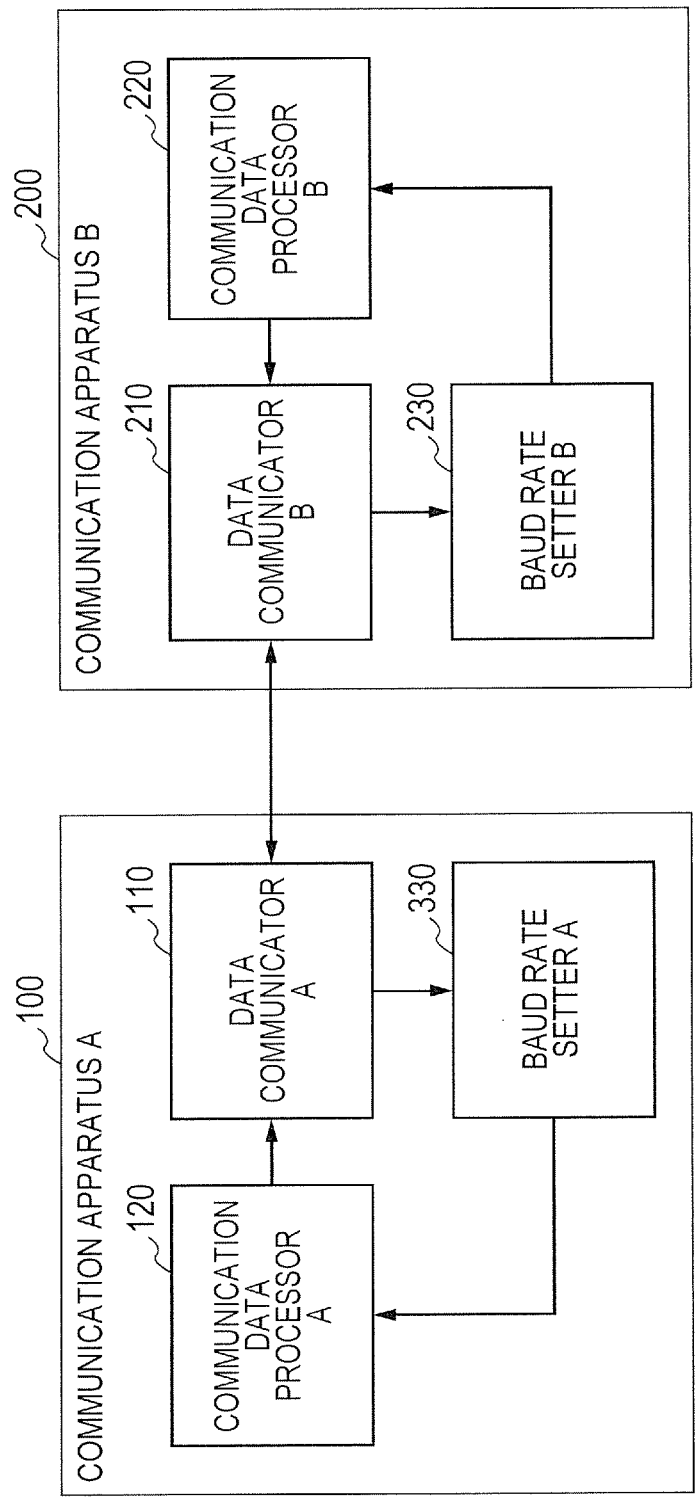
FIG. 7 shows configurations of a communication apparatus A100 and a communication apparatus B200 in Embodiment 2.

FIG. 7 shows configurations of communication apparatuses according to the second embodiment of the present invention. Note that the same components as those in FIG. 1 are denoted by the same reference signs, and descriptions thereof will be omitted.

A baud rate setter A330 is configured to perform almost the same operations as the baud rate setter A130 in FIG. 1, but is denoted by a different reference sign because the baud rate setter A330 operates according to different judgements. In addition, only different configuration will be described.

The baud rate setter A330 is configured to maintain, for a predetermined time, a baud rate changed based on a reception error. Moreover, the baud rate setter A330 is configured to change the baud rate according to a communication connection command period detected after multiple reception errors are detected.

Next, using FIG. 8, description will be given of processing with the baud rate setter A330 in which the communication apparatus A100 changes a communication baud rate to, and in conformity with, the same baud rate as that of the communication apparatus B200.

Figure 8:
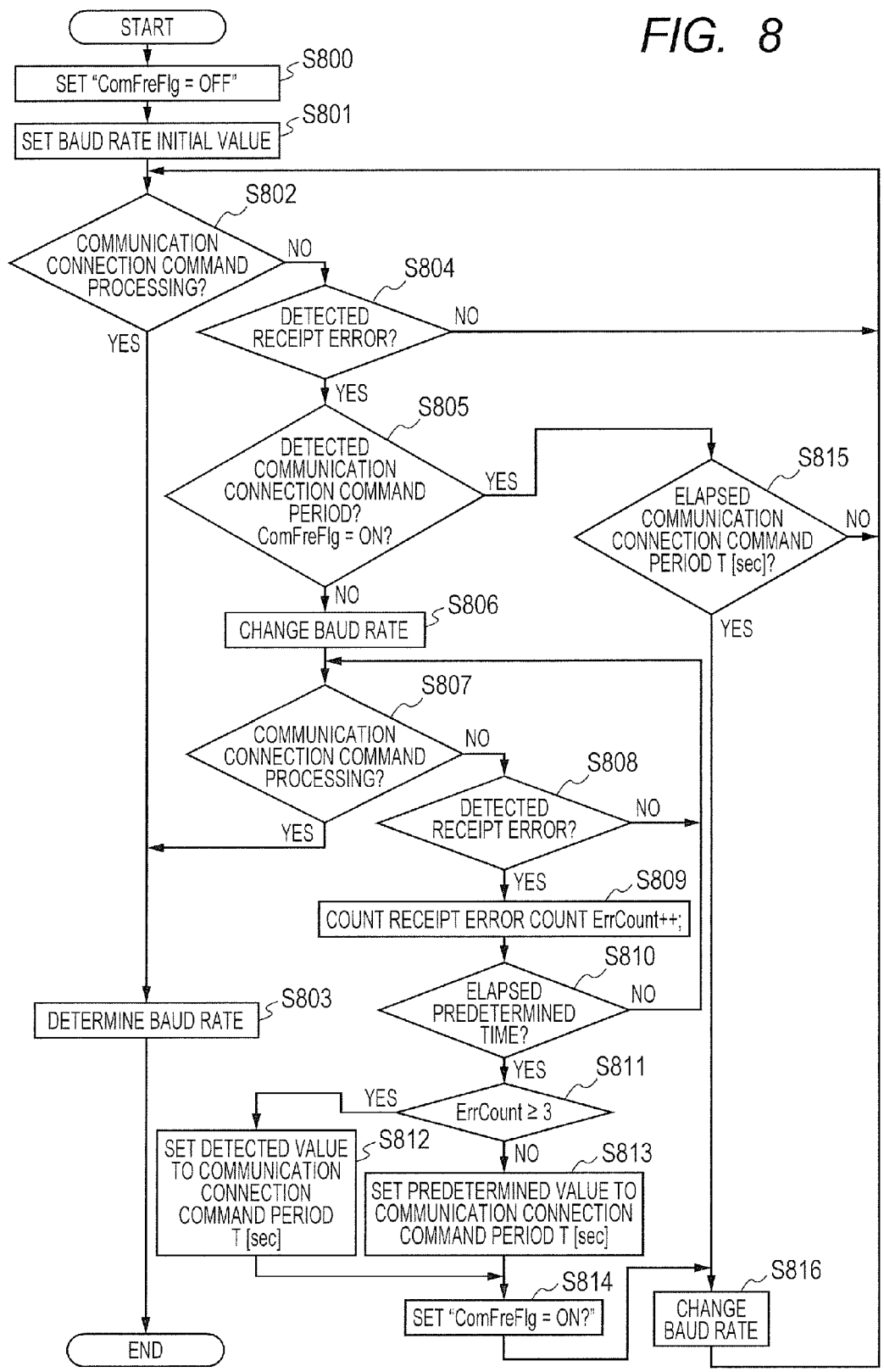
FIG. 8 shows a processing flowchart of a baud rate setter A330 in Embodiment 2.

FIG. 8 is a flowchart showing the processing until the baud rate setter A330 determines a baud rate.

In S800, a flag "ComFreFlg" indicating the detection of a communication connection command period T [sec] is set to "OFF". Then, the processing proceeds to S801.

In S801, the baud rate is set to the initial value. Then, the processing proceeds to S802.

In S802, whether the communication data processor A120 has processed any communication connection command or not is checked. If a communication connection command has been processed, the processing proceeds to S803. If no communication connection command has been processed, the processing proceeds to S804.

In S803, the baud rate is determined. Then, the processing ends.

In S804, whether the communication data processor A120 has detected any reception error or not is checked. If a reception error(s) have been detected, the processing proceeds to S805. If no reception error has been detected, the processing returns to S802.

In S805, if the flag "ComFreFlg" indicating that a communication connection command period T [sec] has been detected is "ON", the processing proceeds to S815. Otherwise, the processing proceeds to S806.

In S806, the baud rate is set from A [bps] to B [bps]. Then, the processing proceeds to S807.

In S807, whether the communication data processor A120 has processed any communication connection command or not is checked. If a communication connection command has been processed, the processing proceeds to S803. If no communication connection command has been processed, the processing proceeds to S808.

In S808, whether the communication data processor A120 has detected any reception error or not is checked. If a reception error(s) have been detected, the processing proceeds to S809. If no reception error has been detected, the processing proceeds to S807.

In S809, the number of reception errors detected by the communication data processor A120 is counted. Then, the processing proceeds to S810.

In S810, whether a predetermined time has elapsed or not is judged. If the predetermined time has elapsed, the processing proceeds to S811. If the predetermined time has not elapsed, the processing returns to S807.

In S811, whether the number of reception errors generated so far and counted by the communication data processor A120 is 3 or more is judged. If the condition is satisfied, the processing proceeds to S812. If the condition is not satisfied, the processing proceeds to S813.

In S812, the connection command period T [sec] is set to a detected value. Then, the processing proceeds to S814.

In S813, the connection command period T [sec] is set to a predetermined value. Then, the processing proceeds to S814.

In S814, the flag "ComFreFlg" indicating that a communication connection command period T [sec] has been detected is set to "ON". Then, the processing proceeds to S816.

In S815, whether the communication connection command period T [sec] has elapsed or not is judged. If the communication connection command period T [sec] has not elapsed, the processing returns to S802. If the communication connection command period T [sec] has elapsed, the processing proceeds to S816.

In S816, the baud rate is changed. Specifically, if the baud rate has been A [bps], it is set to B [bps], or if B [bps], the baud rate is set to A [bps]. Then, the processing returns to S802.

According to the processing flow described above, the communication apparatus A100 is capable of: changing a communication baud rate in conformity with the communication apparatus B200; and starting the communication at the same baud rate.

Next, using FIG. 9, description will be given of a method for detecting a communication connection command period from reception intervals of communication connection commands, the intervals being detected by detecting reception errors.

Figure 9:
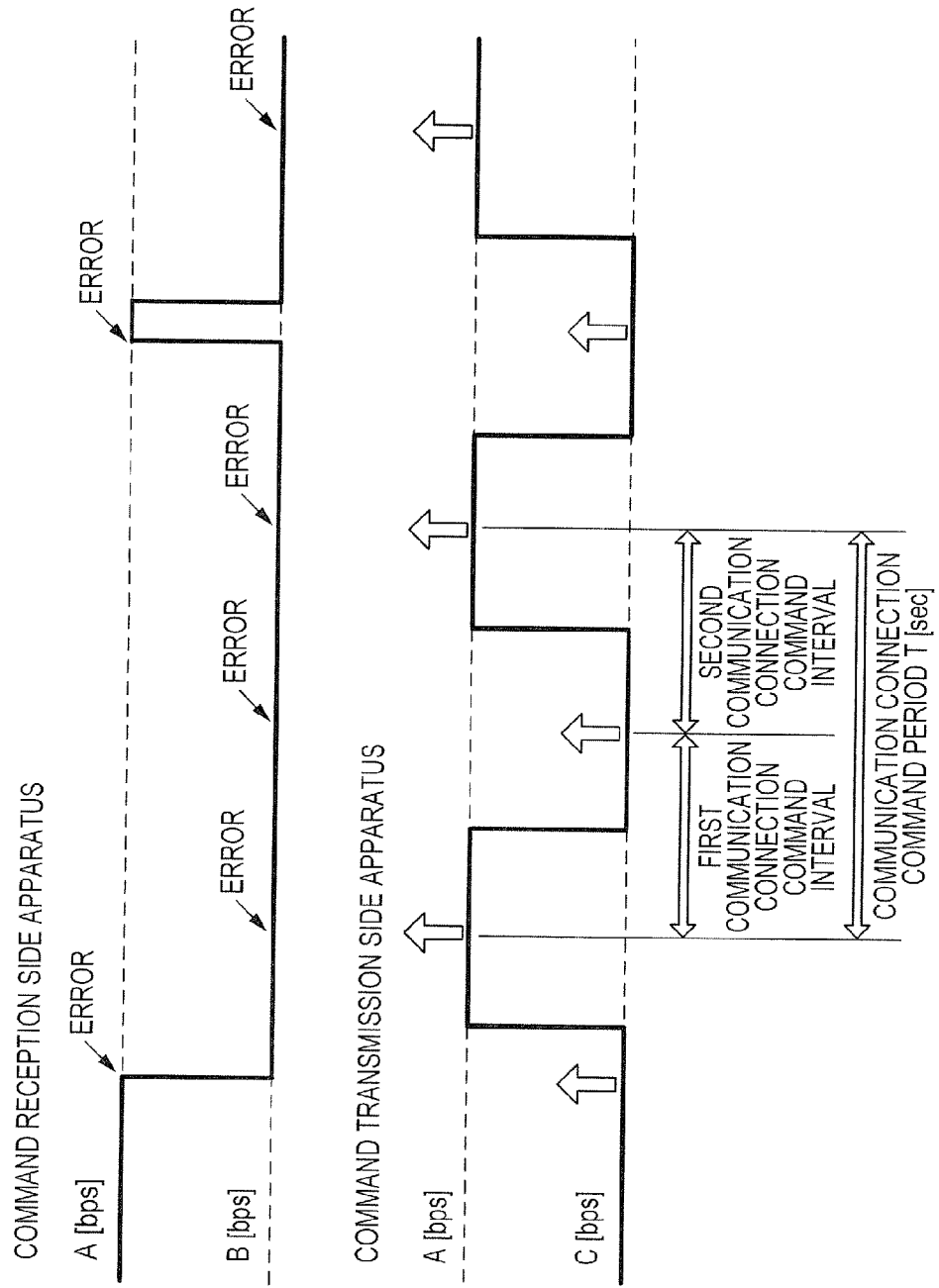
FIG. 9 shows baud rate transitions when the apparatuses have different baud rates in Embodiment 2.

FIG. 9 shows the apparatuses transmitting and receiving communication connection commands therebetween at different baud rates in which communication connection commands of the transmission side apparatus indicate errors generated in the reception side apparatus. Since the generation of a communication connection command can be found by detecting reception error generation, when the generations of three reception errors are detected as illustrated and corresponding three reception times of the communication connection commands are found, combining these gives the first and the second communication connection command intervals. Here, a communication connection command period T [sec] is obtained from two communication connection command intervals.

As described using FIG. 9 above, a communication connection command period can be detected from reception intervals of communication connection commands, the intervals being detected by detecting reception error generations.

Figure 10:
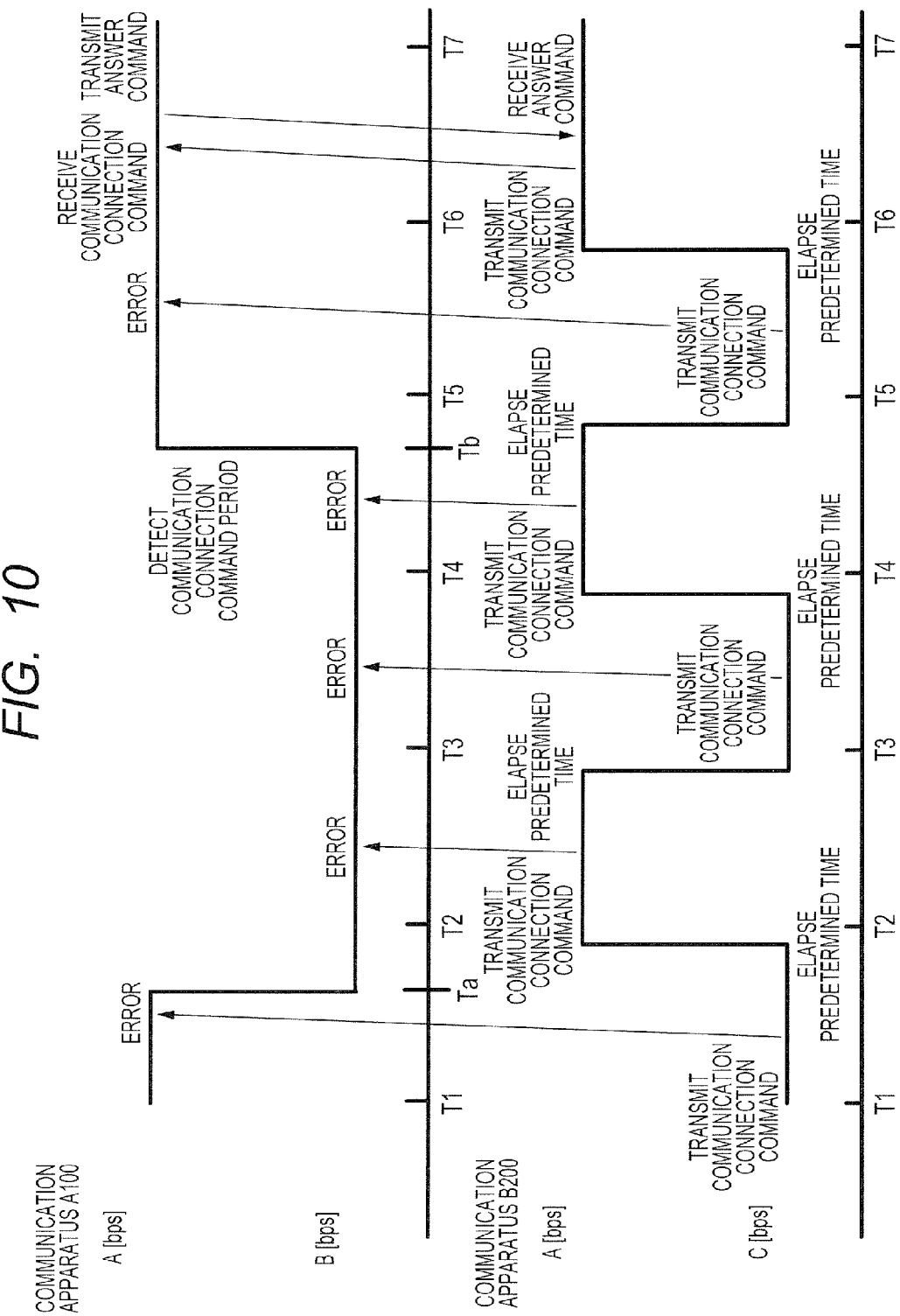
FIG. 10 shows baud rate transitions until the apparatuses determine baud rates in Embodiment 2.

Finally, using FIGS. 3, 8, and 10, description will be given that the communication apparatuses according to the second embodiment of the present invention are capable of changing the respective communication baud rates, determining a baud rate allowing transmission and reception, and performing communication therebetween. The description of the content of FIG. 10 is the same as that of FIG. 6 and will be omitted.

In the zone [T1-T2], a communication is started, and the flag "ComFreFlg" indicating that a communication connection command period T [sec] has been detected is set to "OFF" (S800). The baud rate setter A330 sets the baud rate initial value of the communication apparatus to A [bps] (S801). The baud rate setter B230 sets the baud rate initial value of the communication apparatus to C [bps] (S301). The data communicator B210 transmits a communication connection command at C [bps]. The data communicator A110 receives the communication connection command at A [bps]. Since the transmission side and the reception side have different baud rates, a reception error occurs. The baud rate setter A330 checks that no communication connection command has been processed (S802), and that the communication data processor A120 has detected the reception error (S804). Moreover, the baud rate setter A330 checks that no communication connection command period T [sec] has been detected (S805). Then, the baud rate is changed to B [bps] (S806). The baud rate setter B230 checks that the predetermined time has elapsed (S304) with no answer command being processed (S302). Then, the baud rate is changed to A [bps] (S305).

In the zone [T2-T3], the data communicator B210 transmits a communication connection command again at A [bps]. The data communicator A110 receives the communication connection command at B [bps]. Since the transmission side and the reception side have different baud rates, a reception error occurs. The baud rate setter A330 checks that no communication connection command has been processed (S807), and that the communication data processor A120 has detected the reception error (S808). Then, the baud rate setter A330 increments the count value (S809). Since the predetermined time has not elapsed (S810), the baud rate is not changed (fixed). The baud rate setter B230 checks that the predetermined time has elapsed (S304) with no answer command being processed (S302). Then, the baud rate is changed to C [bps] (S305).

In the zone [T3-T4], the data communicator B210 transmits a communication connection command again at C [bps]. The data communicator A110 receives the communication connection command at B [bps]. Since the transmission side and the reception side have different baud rates, a reception error occurs. The baud rate setter A330 checks that no communication connection command has been processed (S807), and that the communication data processor A120 has detected the reception error (S808). Then, the baud rate setter A330 increments the count value (S809). Since the predetermined time has not elapsed (S810), the baud rate is not changed (fixed). The baud rate setter B230 checks that the predetermined time has elapsed (S304) with no answer command being processed (S302). Then, the baud rate is changed to A [bps] (S305).

In the zone [T4-T5], the data communicator B210 transmits a communication connection command again at A [bps]. The data communicator A110 receives the communication connection command at B [bps]. Since the transmission side and the reception side have different baud rates, a reception error occurs. The baud rate setter A330 checks that no communication connection command has been processed (S807), and that the communication data processor A120 has detected the reception error (S808). Then, the baud rate setter A330 increments the count value (S809). Moreover, the baud rate setter A330 checks that the predetermined time has elapsed (S810). Since the number of reception errors generated so far and counted is 3 or more (S811), the communication connection command period T [sec] is set to the detected value (S812). Further, the flag "ComFreFlg" indicating that a communication connection command period T [sec] has been detected is set to "ON" (S814). Then, the baud rate is changed to A [bps] (S816). The baud rate setter B230 checks that the predetermined time has elapsed (S304) with no answer command being processed (S302). Then, the baud rate is changed to C [bps] (S305).

In the zone [T5-T6], the data communicator B210 transmits a communication connection command again at C [bps]. The data communicator A110 receives the communication connection command at A [bps]. Since the transmission side and the reception side have different baud rates, a reception error occurs. The baud rate setter A330 checks that no communication connection command has been processed (S802), and that the communication data processor A120 has detected the reception error (S804). Moreover, the baud rate setter A330 checks that the communication connection command period T [sec] has been detected (S805). Since the communication connection command period T [sec] has not elapsed (S815), the baud rate is not changed. The baud rate setter B230 checks that the predetermined time has elapsed (S304) with no answer command being processed (S302). Then, the baud rate is changed to A [bps] (S305).

In the zone [T6-T7], the data communicator B210 transmits a communication connection command again at A [bps]. The data communicator A110 receives the communication connection command at A [bps]. Since the transmission side and the reception side have the same baud rate, the communication connection command is processed. The baud rate setter A330 checks that the communication data processor A120 has processed the communication connection command (S802). Then, the baud rate is determined (S803). Since the communication connection command has been processed, the data communicator A110 transmits an answer command at A [bps] to the data communicator B210. The data communicator B210 receives the answer command at A [bps]. Since the transmission side and the reception side have the same baud rate, the answer command is processed. The baud rate setter B230 checks that the communication data processor B220 has processed the answer command (S302). Then, the baud rate is determined (S303).

As described above, the communication apparatus A100 is capable of: detecting a communication connection command period in the communication with the communication apparatus B200 configured to input communication connection commands while changing a baud rate; changing a baud rate on the basis of the period to determine a baud rate allowing transmission and reception; and thereby performing the communication.

Embodiment 3

Next, a communication apparatus according to a third embodiment of the present invention will be described below with reference to FIGS. 1, 3, and 11 to 15. In the present embodiment, as one example of the communication apparatus, the description will be given of a communication apparatus configured to perform start-stop synchronous serial communication and to determine a baud rate communicable, between communication apparatuses, among predetermined multiple baud rates.

Figure 11:
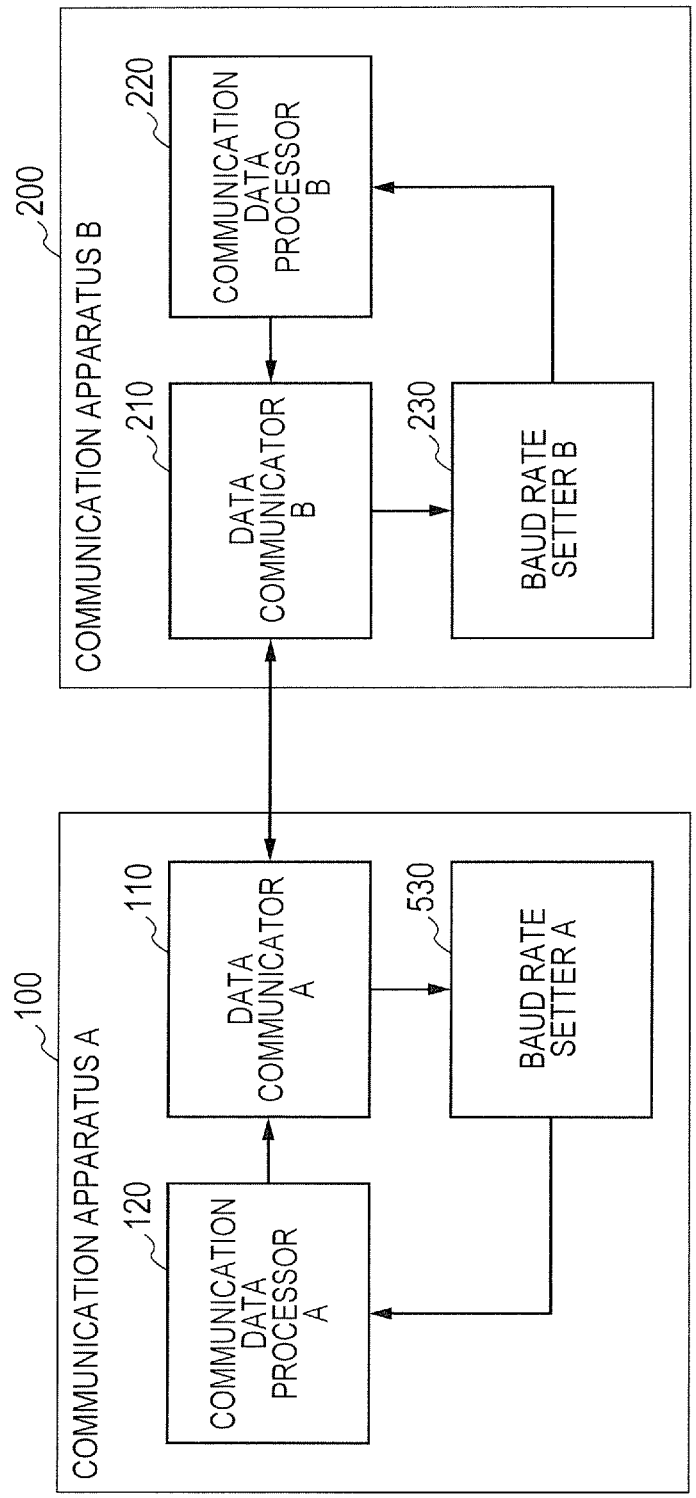
FIG. 11 shows configurations of a communication apparatus A100 and a communication apparatus B200 in Embodiment 3.

FIG. 11 shows configurations of communication apparatuses according to the third embodiment of the present invention. Note that the same components as those in FIG. 1 are denoted by the same reference signs, and descriptions thereof will be omitted.

A baud rate setter A530 is configured to perform almost the same operations as the baud rate setter A130 in FIG. 1, but is denoted by a different reference sign because the baud rate setter A530 operates according to different judgements. In addition, only different configuration will be described.

The baud rate setter A530 is configured to change a baud rate after a predetermined time elapses. Moreover, the baud rate setter A530 is configured to change the baud rate according to a communication connection command period detected after multiple changes in the number of reception errors generated are detected.

In Embodiment 3, the baud rate setter B230 is configured to change a baud rate every a predetermined time until the communication connection is established. Embodiment 3 is different from Embodiments 1 and 2 in that the time length during which a baud rate is fixed is longer than the time interval at which communication connection commands are generated as transmission data at the constant intervals. The time length during which a baud rate is fixed is a length during which communication connection commands can be transmitted twice or more at at least the same baud rate when the communication connection commands are re-transmitted because baud rates have not been matched.

Next, using FIG. 12, description will be given of processing with the baud rate setter A530 in which the communication apparatus A100 changes a communication baud rate to, and in conformity with, the same baud rate as that of the communication apparatus B200.

Figure 12:
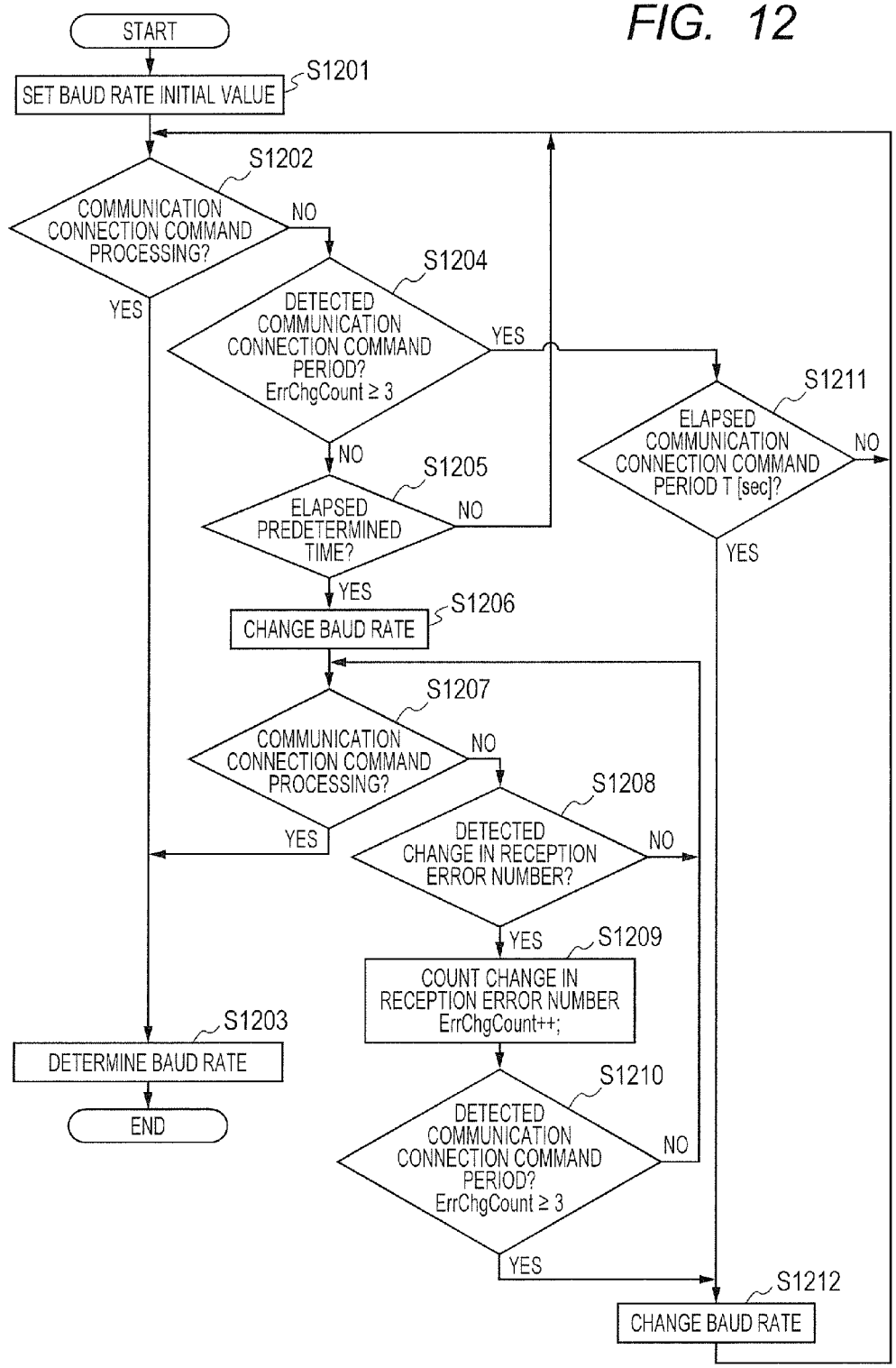
FIG. 12 shows a processing flowchart of a baud rate setter A530 in Embodiment 3.

FIG. 12 is a flowchart showing the processing until the baud rate setter A530 determines a baud rate.

In S1201, the baud rate is set to the initial value, and the processing proceeds to S1202. Here, the initial value is desirably the fastest settable baud rate by the baud rate setter A530, but is not limited thereto.

In S1202, whether the communication data processor A120 has processed any communication connection command or not is checked. If a communication connection command has been processed, the processing proceeds to S1203. If no communication connection command has been processed, the processing proceeds to S1204.

In S1203, the baud rate is determined. Then, the processing ends.

In S1204, if the number of reception errors generated and counted by the communication data processor A120 so far has been changed three times or more, and simultaneously if a communication connection command period T [sec] is detectable, the processing proceeds to S1211. If the communication connection command period T [sec] is undetectable, the processing proceeds to S1205.

In S1205, whether a predetermined time has elapsed or not is judged. If the predetermined time has elapsed, the processing proceeds to S1206. If the predetermined time has not elapsed, the processing returns to S1202.

In S1206, the baud rate is set from A [bps] to B [bps]. Then, the processing proceeds to S1207.

In S1207, whether the communication data processor A120 has processed any communication connection command or not is checked. If a communication connection command has been processed, the processing proceeds to S1203. If no communication connection command has been processed, the processing proceeds to S1208.

In S1208, whether the communication data processor A120 has detected any change in the number of reception errors generated or not is checked. If a change(s) have been detected, the processing proceeds to S1209. If no change has been detected, the processing proceeds to S1207.

In S1209, how many times the number of reception errors generated has been changed is counted. Then, the processing proceeds to S1210.

In S1210, if the number of reception errors generated and counted by the communication data processor A120 so far has been changed three times or more, and simultaneously if the communication connection command period T [sec] is detectable, the processing proceeds to S1212. If the communication connection command period T [sec] is undetectable, the processing returns to S1207.

In S1211, whether the communication connection command period T [sec] has elapsed or not is judged. If the communication connection command period T [sec] has not elapsed, the processing returns to S1202. If the communication connection command period T [sec] has elapsed, the processing proceeds to S1212.

In S1212, the baud rate is changed. Specifically, if the baud rate has been A [bps], it is set to B [bps], or if B [bps], the baud rate is changed to A [bps]. Then, the processing returns to S1202.

According to the processing flow described above, the communication apparatus A100 is capable of changing a communication baud rate to, and in conformity with, the same baud rate as that of the communication apparatus B200.

Next, using FIGS. 13 and 14, description will be given of a method for detecting a change in baud rate from a change in the number of reception errors generated, and detecting a communication connection command period from the change in baud rate.

Figure 13:
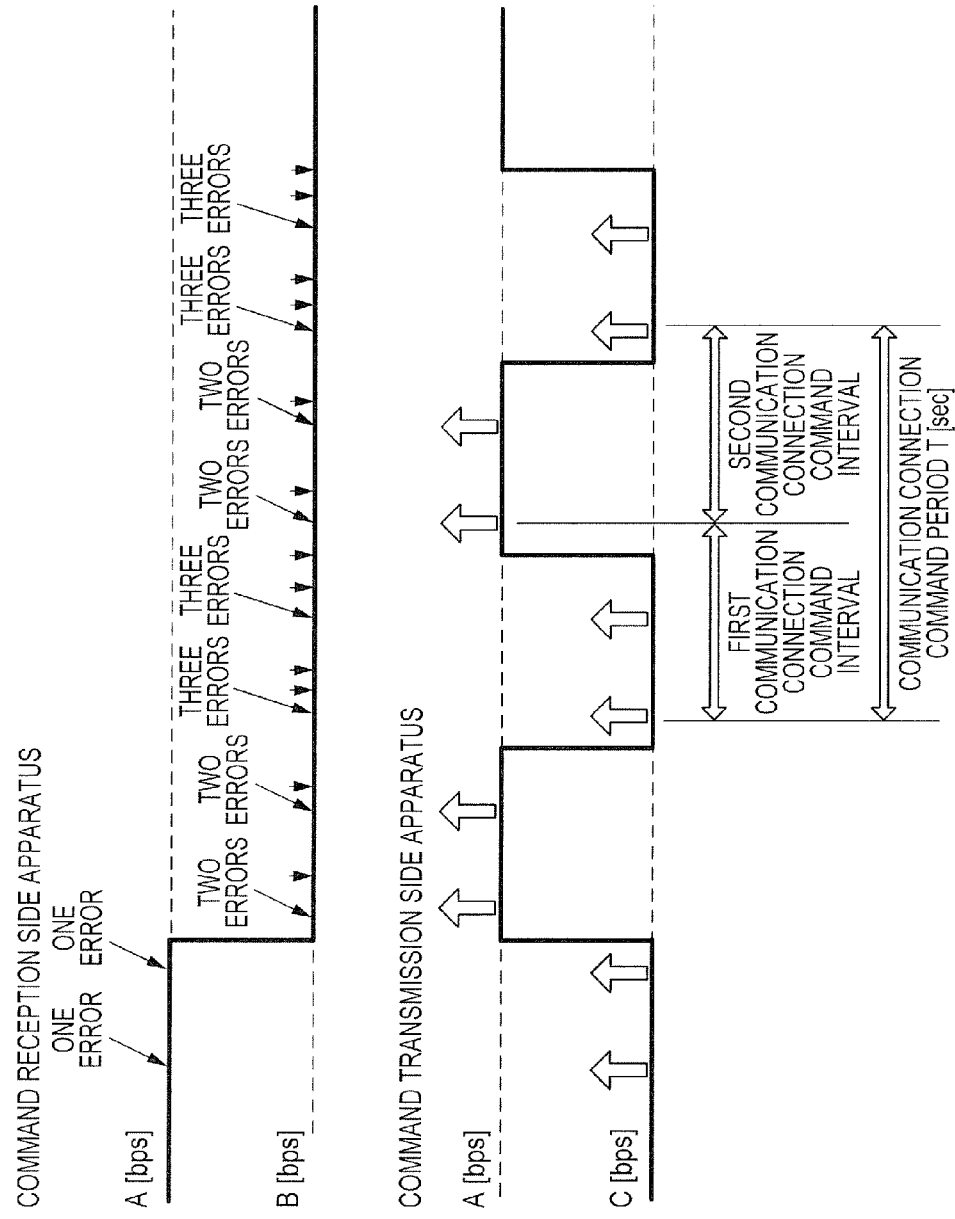
FIG. 13 shows baud rate transitions when the apparatuses have different baud rates in Embodiment 3.

FIG. 13 shows the apparatuses transmitting and receiving communication connection commands therebetween at different baud rates, and illustrates that errors are generated in the reception side apparatus dependently on the communication connection commands of the transmission side apparatus but in different manners. It is shown that the number of errors generated in the reception side apparatus for one communication connection command transmitted varies depending on the baud rates of both of the transmission and reception side apparatuses. The generation of a communication connection command can be found by detecting a reception error. In addition, a change in baud rate in the transmission side apparatus can be found from a change in the number of reception errors generated in the reception side apparatus for one communication connection command. Thus, when three changes in the number of reception errors generated are detected as illustrated and corresponding three reception times of the communication connection commands are found, combining these gives the first and the second communication connection command intervals. Here, a communication connection command period T [sec] is obtained from two communication connection command intervals.

FIG. 14 shows that the number of errors generated in the reception side apparatus for one communication connection command varies depending on the baud rate of the transmission side apparatus and the baud rate of the reception side apparatus. In (A) of FIG. 14, a transmission signal represents a pulse of a signal transmitted from the transmission side apparatus. In (B), transmission data 9800 [bps] is data that serves as a basis when the transmission signal in (A) is converted to a signal at a baud rate of 9800 [bps]. In (C), a reception signal represents a pulse of a signal received by the reception side apparatus. In (D), reception data 19.2 k [bps] is data converted from the signal when the reception signal in (C) is received at a baud rate of 19.2 k [bps]. In (E), a reception signal represents a pulse of a signal received by the reception side apparatus. In (F), reception data 38.4 k [bps] is data converted from the signal when the reception signal in (E) is received at a baud rate of 38.4 k [bps]. Here, the transmission signal in (A), the reception signal in (C), and the reception signal in (E) are exactly the same signals.

When the reception baud rate is faster, the transmission of one communication connection command has not been completed yet at the time of the signal analysis in the reception side apparatus which first detects a start bit ((C) and (E) in FIG. 14). If an error occurs at the first reception, the reception side apparatus will receive the signal again; nevertheless, at this point, the reception side apparatus falsely detects that a signal of the first communication connection command being transmitted is a start bit, and starts receiving the second signal. In this manner, when the baud rate of the reception side apparatus is faster than the baud rate of the transmission side apparatus, since the baud rates do not match with each other, a reception error is generated. In this event, multiple reception errors are generated for one communication connection command. Meanwhile, when no answer command is processed, the baud rate setter B230 of the transmission side apparatus transmits multiple communication connection commands at the same baud rate. The interval between the communication connection commands is sufficiently long relative to the time during which the communication connection commands are transmitted. Hence, when a reception error is generated, multiple reception errors are generated at an interval approximately equal to the interval when the communication connection commands are transmitted.

As described above, although the transmission signal in (A), the reception signal in (C), and the reception signal in (E) are the same, the transmission data and the reception data vary depending on the baud rates of the transmission and reception side apparatuses, and the number of the reception data also varies. For this reason, the number of reception errors generated is also changed depending on the number of the reception data. Thus, when the baud rate of the reception side apparatus is fixed, a change in the number of reception errors in one set of reception errors conceivably indicates that the baud rate of the transmission side apparatus has been changed.

Here, the term "the number of reception errors generated" refers to the number of reception errors generated within a predetermined time, reception errors being generated for one communication connection command transmitted. Moreover, normally, a transmission side apparatus has an answer command reception standby time for waiting for an answer after the transmission side apparatus transmits a communication connection command. When an answer command is not received within the answer command reception standby time, the transmission side apparatus transmits the subsequent communication connection command. Thus, "the number of reception errors generated" is defined as the number of reception errors generated within a predetermined time which is equal to or longer than a time required to receive a communication connection command at the lowest (slowest) baud rate among settable reception baud rates, and which is shorter than the answer command reception standby time. Here, the answer command reception standby time is sufficiently long relative to the transmission time of a communication connection command. For example, the answer command reception standby time is set to be a time of a predetermined length at least 20 times, or at least 100 times, as long as the transmission time of a communication connection command. The answer command reception standby time set in the communication apparatus B on the transmission side may be unclear with respect to the communication apparatus A on the reception side in some cases. Thus, "the number of reception errors generated" may be defined as the number of reception errors generated within a predetermined time which is 1 to 10 times as long as the time required to receive a communication connection command at the lowest (slowest) baud rate among settable reception baud rates.

As described using FIGS. 13 and 14 above, a communication connection command period can be detected from a change in baud rate detected from a change in the number of reception errors generated.

Finally, using FIGS. 3, 12, and 15, description will be given that the communication apparatuses according to the third embodiment of the present invention are capable of changing the respective communication baud rates, determining a baud rate allowing transmission and reception, and performing communication therebetween. The description of the content of FIG. 15 is the same as that of FIG. 6 and will be omitted.

In the zone [T1-T2], a communication is started, and the baud rate setter A530 sets the baud rate initial value of the communication apparatus to A [bps] (S1201). The baud rate setter B230 sets the baud rate initial value of the communication apparatus to C [bps] (S301). The data communicator B210 transmits a communication connection command at C [bps]. The data communicator A110 receives the communication connection command at A [bps]. Since the baud rates during the transmission and during the reception are different, a reception error occurs. The baud rate setter A530 checks that no communication connection command has been processed (S1202), that no communication connection command period T [sec] has been detected (S1204), and that the predetermined time has not elapsed (S1205). The baud rate setter B230 checks that the predetermined time has not elapsed (S304) with no answer command being processed (S302). Subsequently, the data communicator B210 transmits a communication connection command again at C [bps]. The data communicator A110 receives the communication connection command at A [bps]. Since the baud rates during the transmission and during the reception are different, a reception error occurs. The baud rate setter A530 checks that no communication connection command has been processed (S1202), that no communication connection command period T [sec] has been detected (S1204), and that the predetermined time has elapsed (S1205). Then, the baud rate is changed to B [bps]. The baud rate setter B230 checks that the predetermined time has elapsed (S304) with no answer command being processed (S302). Then, the baud rate is changed to A [bps].

In the zone [T2-T3], the data communicator B210 transmits a communication connection command again at A [bps]. The data communicator A110 receives the communication connection command at B [bps]. Since the baud rates during the transmission and during the reception are different, reception errors occur. The baud rate setter A530 checks that no communication connection command has been processed (S1207), and that the communication data processor A120 has not detected any change in the number of reception errors generated (S1208). The baud rate setter B230 checks that the predetermined time has not elapsed (S304) with no answer command being processed (S302). Subsequently, the data communicator B210 transmits a communication connection command again at A [bps]. The data communicator A110 receives the communication connection command at B [bps]. Since the baud rates during the transmission and during the reception are different, reception errors occur. The baud rate setter A530 checks that no communication connection command has been processed (S1207), and that the communication data processor A120 has not detected any change in the number of reception errors generated (S1208). B230 checks that the predetermined time has elapsed (S304) with no answer command being processed (S302). Then, the baud rate is changed to C [bps].

In the zone [T3-T4], the data communicator B210 transmits a communication connection command again at C [bps]. The data communicator A110 receives the communication connection command at B [bps]. Since the baud rates during the transmission and during the reception are different, reception errors occur. Further, since the reception baud rate has changed with the transmission baud rate unchanged, the number of reception errors generated is changed. The baud rate setter A530 checks that no communication connection command has been processed (S1207), and that the communication data processor A120 has detected the change in the number of reception errors generated (S1208). Furthermore, the baud rate setter A530 increments the count value of the change in the number of reception errors generated (S1209), and checks that no communication connection command period T [sec] has been detected (S1210). The baud rate setter B230 checks that the predetermined time has not elapsed (S304) with no answer command being processed (S302). Subsequently, the data communicator B210 transmits a communication connection command again at C [bps]. The data communicator A110 receives the communication connection command at B [bps]. Since the baud rates during the transmission and during the reception are different, reception errors occur. The baud rate setter A530 checks that no communication connection command has been processed (S1207), and that the communication data processor A120 has not detected any change in the number of reception errors generated (S1208). B230 checks that the predetermined time has elapsed (S304) with no answer command being processed (S302). Then, the baud rate is changed to A [bps].

In the zone [T4-T5], the data communicator B210 transmits a communication connection command again at A [bps]. The data communicator A110 receives the communication connection command at B [bps]. Since the baud rates during the transmission and during the reception are different, reception errors occur. Further, since the reception baud rate has changed with the transmission baud rate unchanged, the number of reception errors generated is changed. The baud rate setter A530 checks that no communication connection command has been processed (S1207), and that the communication data processor A120 has detected the change in the number of reception errors generated (S1208). Furthermore, the baud rate setter A530 increments the count value of the change in the number of reception errors generated (S1209), and checks that no communication connection command period T [sec] has been detected (S1210). The baud rate setter B230 checks that the predetermined time has not elapsed (S304) with no answer command being processed (S302). Subsequently, the data communicator B210 transmits a communication connection command again at A [bps]. The data communicator A110 receives the communication connection command at B [bps]. Since the baud rates during the transmission and during the reception are different, reception errors occur. The baud rate setter A530 checks that no communication connection command has been processed (S1207), and that the communication data processor A120 has not detected any change in the number of reception errors generated (S1208). B230 checks that the predetermined time has elapsed (S304) with no answer command being processed (S302). Then, the baud rate is changed to C [bps].

In the zone [T5-T6], the data communicator B210 transmits a communication connection command again at C [bps]. The data communicator A110 receives the communication connection command at B [bps]. Since the baud rates during the transmission and during the reception are different, reception errors occur. Further, since the reception baud rate has changed with the transmission baud rate unchanged, the number of reception errors generated is changed. The baud rate setter A530 checks that no communication connection command has been processed (S1207), and that the communication data processor A120 has detected the change in the number of reception errors generated (S1208). Furthermore, the baud rate setter A530 increments the count value of the change in the number of reception errors generated (S1209). Since the number counted is 3 or more, after the baud rate setter A530 checks that the communication connection command period T [sec] has been detected (S1210), the baud rate is changed to A [bps]. The baud rate setter B230 checks that the predetermined time has not elapsed (S304) with no answer command being processed (S302). Subsequently, the data communicator B210 transmits a communication connection command again at C [bps]. The data communicator A110 receives the communication connection command at A [bps]. Since the baud rates during the transmission and during the reception are different, a reception error occurs. The baud rate setter A530 checks that no communication connection command has been processed (S1202), that the communication connection command period T [sec] has been detected (S1204), and that the communication connection command period T [sec] has not elapsed (S1211). B230 checks that the predetermined time has elapsed (S304) with no answer command being processed (S302). Then, the baud rate is changed to A [bps].

In the zone [T6-T7], the data communicator B210 transmits a communication connection command again at A [bps]. The data communicator A110 receives the communication connection command at A [bps]. Since the baud rates during the transmission and during the reception match with each other, the communication connection command is processed. The baud rate setter A530 checks that the communication data processor A120 has processed the communication connection command (S1202). Then, the baud rate is determined (S1203). Since the communication connection command has been processed, the data communicator A110 transmits an answer command at A [bps]. The data communicator B210 receives the answer command at A [bps]. Since the baud rates during the transmission and during the reception match with each other, the answer command is processed. The baud rate setter B230 checks that the communication data processor B220 has processed the answer command (S302). Then, the baud rate is determined (S303).

It should be noted that the baud rate setter B230 is configured to change a baud rate every a predetermined time until the communication connection is established. In this Embodiment 3, the time length during which a baud rate is fixed has been exemplified by the length during which communication connection command can be transmitted twice. Nevertheless, the present invention of Embodiment 3 is not limited thereto. The time length during which a baud rate is fixed may be a length during which a communication connection command can be transmitted once, or may be a length during which communication connection commands can be transmitted three times or more. The configuration of Embodiment 3 makes it possible to surely detect a communication connection command period, regardless of the number of times communication connection commands are transmitted within the communication time at the fixed baud rate. Incidentally, the descriptions of Embodiments 1 and 2 have been given that when the data communicator A110 receives one communication connection command, if the transmission side and the reception side have different baud rates, a reception error is generated once, for the simplification of the description. Actually, as described in Embodiment 3, when the reception baud rate is higher than the transmission baud rate, multiple reception errors (framing errors) are generated for one communication connection command. Actually, the answer command reception standby time, which is a standby time of the data communicator B210 from a transmission of a communication connection command until the subsequent transmission of a communication connection command, is set sufficiently long relative to the time during which a communication connection command is transmitted at a baud rate selected for use. Utilizing this and treating the reception errors (framing errors) generated for one communication connection command as a single error make it possible to carry out the inventions of Embodiments 1 and 2 as having been described in detail. For example, reception errors generated within a predetermined time set in relation to the time during which a communication connection command is transmitted may be treated as a single error. Reception errors generated within a predetermined time which is 1 to 10 times as long as the time required to receive a communication connection command at the lowest (slowest) baud rate among settable reception baud rates may be treated as a single error. Meanwhile, reception errors generated separately from each other at an interval equal to or longer than a predetermined time set in relation to an answer command reception standby time may be treated as different errors.

As described above, the communication apparatus A100 is capable of: detecting a communication connection command period in the communication with the communication apparatus B200 configured to input communication connection commands while changing a baud rate; changing a baud rate on the basis of the period to determine a baud rate allowing transmission and reception; and thereby performing the communication.

In addition, for example, the interval of communication connection commands to be transmitted and received between two communication apparatuses communicating with each other has been described as a constant interval. Nevertheless, the interval may be unequal intervals. In this case, in detecting command intervals, the time of actually transmitting a communication connection command is set in the unit of microsecond, and the answer command reception standby time is set in the unit of millisecond. Then, the communication connection command intervals can be detected based on the time difference between the two. Combining this with the method for detecting a change in baud rate from a change in the number of errors generated described in Embodiment 3 makes it possible to detect a communication connection command period. As a result, it is possible to change its own baud rate in conformity with the period of the counterpart apparatus to thereby determine a baud rate allowing normal transmission and reception, and perform the communication.

Moreover, for example, the number of predetermined communicable baud rates between two communication apparatuses communicating with each other has been described as two. Nevertheless, the number may be two or more. In this case, in detecting command intervals, a maximum value and a minimum value of the number of errors generated to be detected are detected, and a communication connection command period can be detected from an interval between these extreme values. As a result, it is possible to change its own baud rate in conformity with the period of the counterpart apparatus to thereby determine a baud rate allowing normal transmission and reception, and perform the communication.

A lens apparatus having the communication apparatus of the present invention, and an image pickup apparatus which includes the lens apparatus, a demand for operating the lens apparatus, and a camera apparatus, make it possible to provide highly versatile lens apparatus and image pickup apparatus regardless of a difference in the baud rate specifications for communication connection.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-151986, filed Jul. 31, 2015, which is hereby incorporated by reference herein in its entirety.

What is claimed is:

1. A communication apparatus comprising:
a communicator that communicates with an external device capable of communication at multiple communication rates;
a communication rate setter that sets a communication rate of the communicator; and
a period detector that detects a period as a time of completing a series of communication connection commands at the multiple communication rates prior to establishing any communication with the external device, wherein
the communication rate setter sets the communication rate matched to that of the external device based on the detected period.

2. The communication apparatus according to claim 1, further comprising a reception error detector that detects a reception error of the communication connection commands received by the communicator,
wherein the period detector detects the period based on the detected reception error.

3. The communication apparatus according to claim 2, wherein if the reception error is detected, the communication rate setter switches the communication rate until the period detector detects the period.

4. The communication apparatus according to claim 2, wherein the period detector causes the communication rate setter to fix the communication rate for a predetermined time, and detects the period based on a number of times the reception error is detected.

5. The communication apparatus according to claim 3, wherein the period detector treats, as a single reception error, one or more reception errors detected within a predetermined time determined based on a time required to receive the communication connection command at the lowest communication rate among communication rates settable by the communication rate setter.

6. The communication apparatus according to claim 2, wherein the period detector detects the period based on a change in a number of times the reception error is detected within a predetermined time determined based on a time required to receive the communication connection command at the lowest communication rate among communication rates settable by the communication rate setter.

7. The communication apparatus according to claim 1, wherein after the period detector detects the period, the communication rate setter sets the communication rate according to the period until a communication connection to the external device is established.

8. A lens apparatus comprising a communication apparatus, the communication apparatus comprising:
a communicator that communicates with an external device capable of communication at multiple communication rates;
a communication rate setter that sets a communication rate of the communicator; and
a period detector that detects a period as a time of completing a series of communication connection commands at the multiple communication rates prior to establishing any communication with the external device, wherein
the communication rate setter sets the communication rate matched to that of the external device based on the detected period.

9. An image pickup apparatus comprising:
a camera apparatus; and
a lens apparatus comprising a communication apparatus, the communication apparatus comprising:
a communicator that communicates with the camera apparatus capable of communication at multiple communication rates;
a communication rate setter that sets a communication rate of the communicator; and
a period detector that detects a period as a time of completing a series of communication connection commands at the multiple communication rates prior to establishing any communication with the camera apparatus,
wherein the communication rate setter sets the communication rate matched to that of the camera apparatus based on the detected period.

* * * * *